US008610662B2

(12) United States Patent
Boom et al.

(10) Patent No.: US 8,610,662 B2
(45) Date of Patent: Dec. 17, 2013

(54) DRIVING OF ELECTROWETTING DISPLAYS

(75) Inventors: Robert Gerardus Hendrik Boom, Venlo (NL); Roy Van Dijk, Eindhoven (NL); Henricus Petronella Maria Derckx, Wert (NL)

(73) Assignee: Liquavista B.V., Eindhoven (NL)

( * ) Notice: Subject to any disclaimer, the term of this patent is extended or adjusted under 35 U.S.C. 154(b) by 966 days.

(21) Appl. No.: 12/515,125

(22) PCT Filed: Nov. 15, 2007

(86) PCT No.: PCT/EP2007/062429

§ 371 (c)(1), (2), (4) Date: Oct. 8, 2009

(87) PCT Pub. No.: WO2008/059040

PCT Pub. Date: May 22, 2008

(65) Prior Publication Data

US 2010/0053234 A1 Mar. 4, 2010

(30) Foreign Application Priority Data

Nov. 16, 2006 (GB) .................................. 0622898.5

(51) Int. Cl.

| | |
|---|---|
| ***G09G 3/34*** | (2006.01) |
| ***G09G 3/04*** | (2006.01) |
| ***G09G 3/19*** | (2006.01) |
| ***G09G 3/38*** | (2006.01) |
| ***G06F 3/038*** | (2013.01) |

(52) U.S. Cl.

USPC ................ 345/107; 345/34; 345/49; 345/84; 345/105; 345/204; 345/208; 345/211

(58) Field of Classification Search

USPC .......... 345/33–34, 49, 84, 107, 204, 208, 211

See application file for complete search history.

(56) References Cited

U.S. PATENT DOCUMENTS 5,959,763 A * 9/1999 Bozler et al. .................. 359/290
6,317,122 B1 11/2001 Yamazaki (Continued)

FOREIGN PATENT DOCUMENTS

EP 1139330 A2 4/2001
WO 03/071346 A1 8/2003

(Continued)

OTHER PUBLICATIONS

Written Opinion of the International Searching Authority for PCT/EP2007/062429 mailed Apr. 24, 2008.

(Continued)

*Primary Examiner* — Lun-Yi Lao
*Assistant Examiner* — Jarurat Suteerawongsa
(74) *Attorney, Agent, or Firm* — BainwoodHuang

(57) ABSTRACT

The invention relates to a method of driving an electrowetting display which includes a plurality of electrowetting elements, the display comprising at least one first fluid and a second fluid immiscible with each other, each of the electrowetting elements comprising at least one surface area. In a first, relatively low voltage, driving state of an electrowetting element the second fluid tends to cover the at least one surface area, and in a second, relatively high voltage, driving state of an electrowetting element the first fluid tends to cover the at least one surface area. The method comprises: providing a voltage booster circuit to generate a voltage signal to be applied across one or more selected ones of the plurality of electrowetting elements; and during driving of the one or more selected elements in the second driving state, selectively switching the voltage booster circuit on and off such that the voltage booster circuit is operative only some of the time and the voltage signal includes a voltage ripple variation. The invention further relates to electrowetting display apparatus adapted to perform the method of the invention.

11 Claims, 6 Drawing Sheets

(56) References Cited

U.S. PATENT DOCUMENTS

| | | | | |
|---|---|---|---|---|
| 6,519,419 | B2 * | 2/2003 | Shimada et al. | 396/277 |
| 6,879,135 | B2 | 4/2005 | Fontanella | |
| 6,992,469 | B1 | 1/2006 | King | |
| 7,420,549 | B2 * | 9/2008 | Jacobson et al. | 345/204 |
| 2004/0052095 | A1 | 3/2004 | Muegge et al. | |
| 2005/0088395 | A1 | 4/2005 | Chung | |
| 2005/0156854 | A1 * | 7/2005 | Park et al. | 345/100 |
| 2005/0195182 | A1 * | 9/2005 | Tahata | 345/211 |
| 2005/0200310 | A1 | 9/2005 | Brown | |

FOREIGN PATENT DOCUMENTS

| | | | |
|---|---|---|---|
| WO | 2005/036517 | A1 | 4/2005 |
| WO | 2005/098797 | A2 | 10/2005 |

OTHER PUBLICATIONS

Hayes 1 R A et al., "52.1: A High Brightness Colour 160 PPI Reflective Display Technology Based on Electrowetting", 2004 SID International Symposium, (May 25-27, 2004), pp. 1412-1415.

Anonymous: "TNY274-280 TinySwitch-III Family Energy Efficient, Offline Switcher with Enhanced Flexibility and Extended Power Range", Power Integration Data Sheet, [Online], (Jun. 2006).

Feenstra, B.J. et al., "Electrowetting-Based Displays: Bringing Microfluidics Alive On-Screen", Micro Electro Mechanical Systems, (Jan. 22-26, 2006), pp. 48-53.

International Search Report dated Apr. 24, 2008 from Application No. PCT/EP2007/062429, International Filing Date: Nov. 15, 2007, 4 pages.

United Kingdom Search Report dated Jun. 27, 2007 from Application No. GB 0622898.5, 1 page.

Hayes, R. A., et al., "52.1: A High Brightness Colour 160 PPI Reflective Display Technology Based on Electrowetting", 2004 SID International Symposium, Seattle, WA, May 25-27, 2004, SID International Symposium, San Jose, CA, US, May 25, 2004, pp. 1412-1415.

Anonymous, TNY274-280 TinySwitch-III Family Energy Efficient, Offline Switcher with Enhanced Flexibility and Extended Power Range, Power Integration Data Sheet, Online, Jun. 2006, Retrieved from the Internet: URL:HTTP://www.powerintcom/PDFFiles/tny274-280.pdf> [Retrieved on Mar. 7, 2008].

Feenstra, B. J., et al., "Electrowetting-Based Displays: Brining Microfluidics Alive On-Screen", Micro Electro Mechanical Systems, 2006, MEMS 2006 Istanbul, 19th IEEE International Conference on Istanbul, Turkey Jan. 22-26, Piscataway, NJ, USA,, IEEE Jan. 22, 2006, pp. 48-53.

* cited by examiner

DRIVING OF ELECTROWETTING DISPLAYS

This application is the U.S. national phase of International Application No. PCT/EP2007/062429 filed 15 Nov. 2007, which designated the U.S. and claims priority to Great Britain Application Nos. 0622898.5 filed 16 Nov. 2006, the entire contents of each of which are hereby incorporated by reference.

FIELD OF THE INVENTION

This invention relates to a method of driving of electrowetting displays, and electrowetting display apparatus.

BACKGROUND OF THE INVENTION

A recently developed type of electro-optic display is an electrowetting display, as described amongst others in international patent applications WO 2003/071346 and WO 2005/098797.

A disadvantage of the known electrowetting display is the relatively high driving voltages which are required to drive the electrowetting elements of the display. The voltage across the electrowetting elements Vew is in the region of 30V, which if using a conventional battery, at say 3V, requires boosting using a DC-DC booster. A disadvantage of the switching scheme shown is that the power requirements of the DC-DC booster circuit are relatively high. Given the use of such displays in portable electronic devices such as clocks, cellular telephones, etc, power saving is an important desideratum.

U.S. Pat. No. 6,879,135 describes a DC-DC booster circuit. The DC-DC booster circuit includes a number of voltage multiplying stages which have the same circuit structure, and which are controlled in a switched manner using a high frequency clock frequency, at a predetermined switching frequency.

United States Patent Publication US 2005/0195182 describes a driver circuit for driving scan lines of an LCD active matrix panel. The document describes varying a switching frequency of a DC-DC booster circuit. The boost operation clock signal is synchronised with a predetermined edge of a frame synchronisation signal.

It would be desirable to provide an improved way of driving an electrowetting display apparatus.

SUMMARY OF THE INVENTION

In accordance with one aspect of the present invention, there is provided a method of driving an electrowetting display which includes a plurality of electrowetting elements, the display comprising at least one first fluid and a second fluid immiscible with each other, each of said electrowetting elements comprising at least one surface area, wherein in a first, relatively low voltage, driving state of an electrowetting element said second fluid tends to cover said at least one surface area, and in a second, relatively high voltage, driving state of an electrowetting element said first fluid tends to cover said at least one surface area, the method comprising:

providing a voltage booster circuit to generate a voltage signal to be applied across one or more selected ones of said plurality of electrowetting elements;

during driving of said one or more selected elements in said second driving state, selectively switching said voltage booster circuit on and off such that said voltage booster circuit is operative only some of the time and said voltage signal includes a voltage ripple variation.

The present invention stems from the realisation that, unlike other display types, in the case of electrowetting displays, significant voltage ripple can be controlled to be an acceptable variation in the voltage applied across the display elements. Thus, power can be saved by intermittently operating the voltage booster circuit without causing artefacts in the image or otherwise deleteriously affecting the display quality. This is partly because of hysteresis effects in the electrowetting elements. Further, whilst the voltage to open an electrowetting element needs to be above a certain level, voltages in excess of this level will result in the same, or at least similar, behaviour of the element such that the voltage variations are substantially undetectable to the eye of the viewer.

The switching may be conducted such that said voltage booster circuit is operative less than half of the time. More preferably, said voltage booster circuit is operative less than a quarter of the time. Yet more preferably, said voltage booster circuit is operative less than one tenth of the time.

The higher the variation which is allowed, the greater the potential power saving. Preferably, the allowed voltage ripple variation has a magnitude of at least 0.2 volts. More preferably the allowed voltage ripple variation has a magnitude of at least 0.5 volts. The voltage ripple variation may be in the region of 1V. Since display quality may be affected if too high a voltage ripple variation is allowed, the magnitude of the voltage ripple variation is preferably less than 5V, at least on average.

Since the electrowetting elements are able to operate with voltage signals containing the voltage ripple variation, no further voltage smoothing circuitry is required. Thus the voltage signal containing the voltage ripple variation may be applied directly to the electrowetting elements.

Further features and advantages of the invention will become apparent from the following description of preferred embodiments of the invention, given by way of example only, which is made with reference to the accompanying drawings.

DETAILED DESCRIPTION OF THE INVENTION

Figure 1:
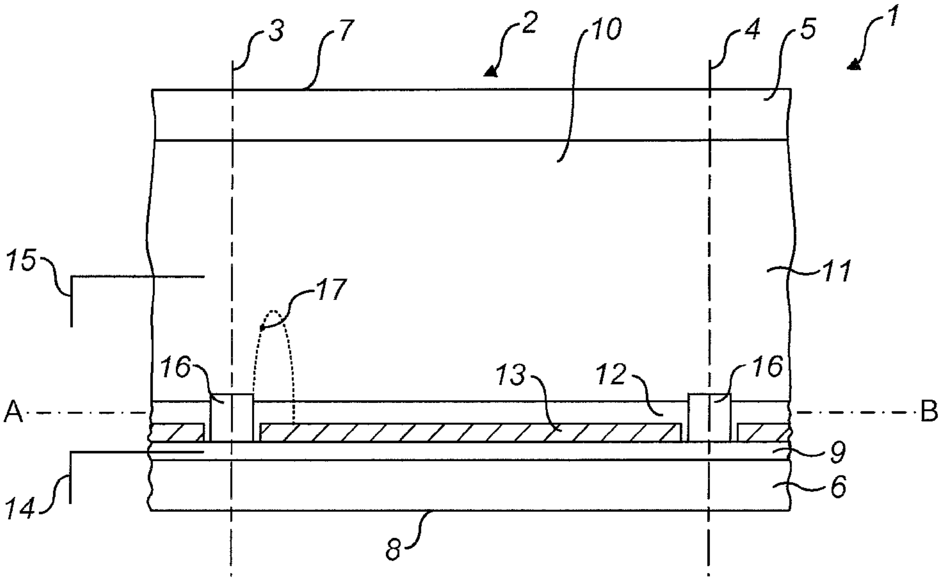
FIG. 1 shows a diagrammatic cross-section of a part of an embodiment of electro-optic display apparatus according to the invention.

FIG. 1 shows a diagrammatic cross-section of an embodiment of an electrowetting display apparatus 1 according to the invention. The display apparatus includes a plurality of electrowetting elements 2, one of which is shown in the Figure. The lateral extent of the element is indicated in the Figure by the two dashed lines 3, 4. The electrowetting elements comprise a first support plate 5 and a second support plate 6. The support plates may be separate parts of each electrowetting element, but the support plates are preferably shared in common by the plurality of electrowetting elements. The support plates may be made for instance of glass or polymer and may be rigid or flexible.

The display apparatus has a viewing side 7 on which an image formed by the display apparatus can be viewed and a rear side 8. The first support plate 5 faces the viewing side; the second support plate 6 faces the rear side 8. The display is, in this embodiment, a segmented display type, in which the image portions are defined by segments which can be switched simultaneously. The image is thus built up of segments. Each segment includes a number of adjacent electrowetting elements 2.

A space 10 between the support plates is filled with two liquids: a first liquid 11 and a second liquid 12. The first liquid is immiscible with the second liquid. The first liquid is electrically conductive or polar, and may be water or a salt solution such as a solution of potassium chloride in a mixture of water and ethyl alcohol. The first liquid is preferably transparent. The second liquid is electrically non-conductive and may for instance be an alkane like hexadecane or (silicone) oil. A hydrophobic layer 13 is arranged on the support plate 6, creating an electrowetting surface area facing the space 10. The layer may be an uninterrupted layer extending over a plurality of electrowetting elements 2 or it may be an interrupted layer, each part extending only over one electrowetting element 2. The layer may be for instance an amorphous fluoropolymer layer such as AF1600 or other low surface energy polymers such as Parylene. The hydrophobic character causes the second liquid to adhere preferentially to the support plate 6 since the second liquid has a higher wettability with respect to the surface of the hydrophobic layer 13 than it has with respect to the first liquid. Wettability relates to the relative affinity of a fluid for the surface of a solid. Wettability increases with increasing affinity, and it can be measured by the contact angle formed between the fluid and the solid. This increases from relative non-wettability at an angle less than 90° to complete wettability when the contact angle is 180°, in which case the liquid forms a film on the surface of the solid.

Each segment is defined by a segment electrode 9 arranged on the second support plate 6. The segment electrode 9 is separated from the liquids by an insulator, which may be the hydrophobic layer 13. In general, the segment electrode 9 will be one of a number of separate electrodes arranged separately on the second support plate 6, each of which can be of any desired shape or form. Each segment electrode will define an image region which overlaps a plurality of electrowetting elements which will all be switched simultaneously by at least the segment electrode. The segment electrode 9 is supplied with voltage signals by a signal line 14. A second signal line 15 is connected to an electrode which is in contact with the conductive first liquid 11. This electrode is common to all segments, since they are fluidly interconnected by and share the second liquid, uninterrupted by walls. The segment electrodes 9 on the support plate 6 each are connected to driving circuitry on the support plate by a matrix of printed wiring.

The lateral extent of the second liquid 12 is constrained to one electrowetting element by walls 16 that follow the cross-section of the electrowetting element in the plane A-B. Further details of the electrowetting elements of the display and their manufacture are disclosed amongst others in international patent application WO 2005/098797.

The second liquid absorbs at least a part of the optical spectrum. The liquid may be transmissive for a part of the optical spectrum, forming a colour filter. For this purpose the liquid may be coloured by addition of pigment particles or dye. Alternatively, the liquid may be black, i.e. absorb substantially all parts of the optical spectrum. The surface of the hydrophobic layer may be white, or a relatively light colour.

When a non-zero voltage is applied between the signal lines 14 and 15, electrostatic forces will move the first liquid 11 towards the segment electrode 9, thereby repelling the second liquid 12 from the area of the hydrophobic layer 13 to the walls 16 surrounding the area of the hydrophobic layer, to a drop-like form as schematically indicated by a dashed line 17. This action uncovers the second liquid from the surface of the hydrophobic layer 13 of the electrowetting element. When the voltage across the element is returned to zero, or a value near to zero, the second liquid flows back to cover the hydrophobic layer 13. In this way the second liquid forms an electrically controllable optical switch in each electrowetting element.

Figure 2:
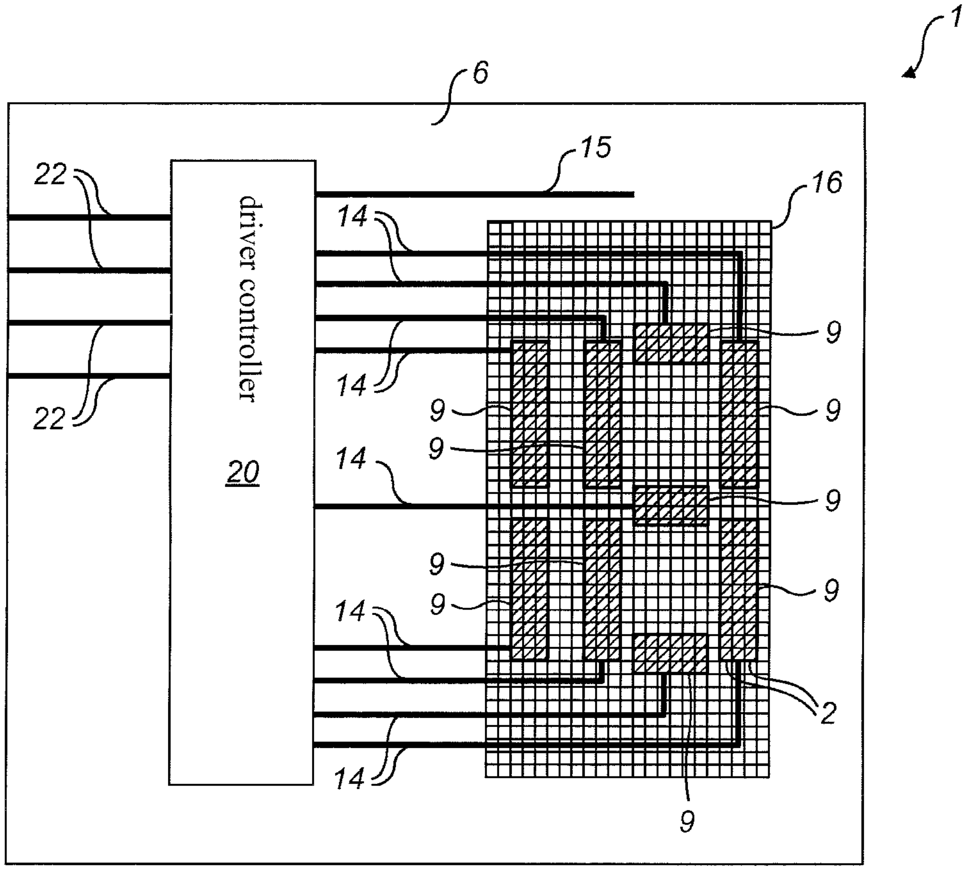
FIG. 2 shows a diagrammatic planar view of a part of an embodiment of electro-optic display apparatus according to the invention.

FIG. 2 shows a diagrammatic planar view of an embodiment of an electrowetting display apparatus 1 according to the invention.

The electrowetting display apparatus is in this embodiment a segmented display in the form of a numeric display which is defined by a number of different segments. The segments can be selectively actuated in order to display a number from 0 to 19. The segments are defined by 9 separate segment electrodes 9 formed on the system plate 6. Each segment electrode is indicated by cross-hatchings in FIG. 2. The display apparatus also includes a raster grid of electrowetting element walls 16 forming square electrowetting elements which cover at least the area of the segment electrodes 9 (only some of the electrowetting elements 2 are labelled in FIG. 2 for clarity). The second liquid 12 is present in at least the electrowetting elements which overlap with the segment electrodes, to form operable electrowetting elements. Those electrowetting elements which are outside the segment electrodes 9 are non-operable. They may also include the second fluid 12, or the second fluid 12 may be missing from the non-operable elements.

The driving circuitry of the display apparatus 1 includes a driver controller 20 in the form of an integrated circuit adhered to the support plate 6. The driver controller 20 includes control logic and switching logic, and is connected to the display by means of segment signal lines 14 and common voltage signal line 15. Each segment electrode signal line 14 connects an output from the driver controller 20 to a different segment electrode 9, respectively. Also included are a set of input data lines 22, whereby the driver controller can be instructed with data so as to determine which segments should be in a selected state and which segments should be in a non-selected state at any time.

By selectively actuating certain of the segment electrodes with an actuating voltage signal, the electrowetting elements which overlap with the selected segment electrodes are driven to an open state, in which the second liquid 12 is removed from the surface of the support plate 6, whilst other non-selected electrodes are driven with a non-electrowetting voltage signal which is equal to, or at least substantially equal to, the common voltage signal applied to the common voltage signal line 15.

Figure 3:
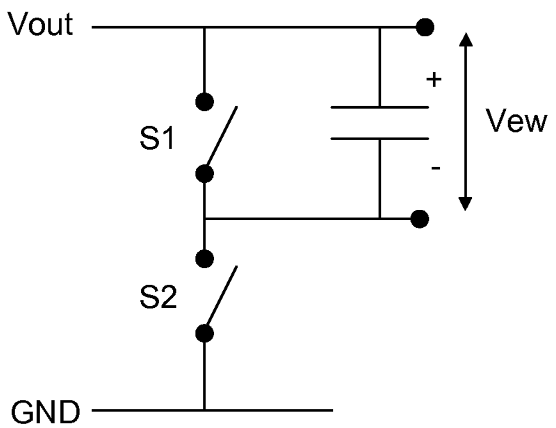
FIG. 3 shows a driver circuitry switching arrangement according to an embodiment of the invention.

FIG. 3 illustrates a switching arrangement implemented in the driver controller 20 for each segment of the electrowetting display apparatus. For each of the signal lines 14 (and thus in respect of each segment 9), a set of switches S1 and S2 are implemented as a driver stage in the driver controller 20. The switches S1 and S2 are operated selectively to generate an actuating voltage signal Vew, which switches between a common voltage signal Vout, also referred to as Vcom, and ground. The common voltage signal Vout is generated using a DC-DC booster circuit, to be described in further detail below. As a result, a voltage Vew is applied across each selected segment, that is to say each electrowetting element within a particular segment receives the voltage Vew.

Figure 4:
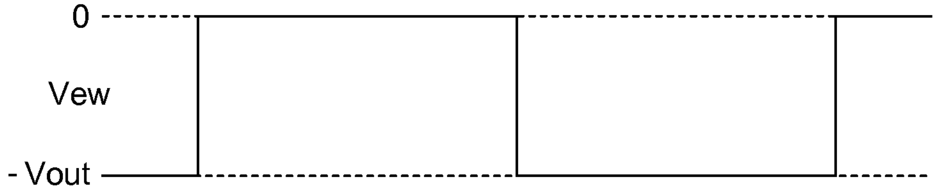
FIG. 4 shows voltage signals generated using the circuitry of FIG. 3.

FIG. 4 illustrates the variation of the actuating voltage signal Vew when driving a segment which is selected as a segment to be driven. FIG. 4 illustrates a driving scheme where the selected segment or segments are driven alternately between a display state, when the voltage Vew across the electrowetting element within the segment is a non-zero voltage (−Vout), and a non-display state in which the voltage Vew across the electrowetting elements of the segment is at a zero voltage level.

Figure 5:
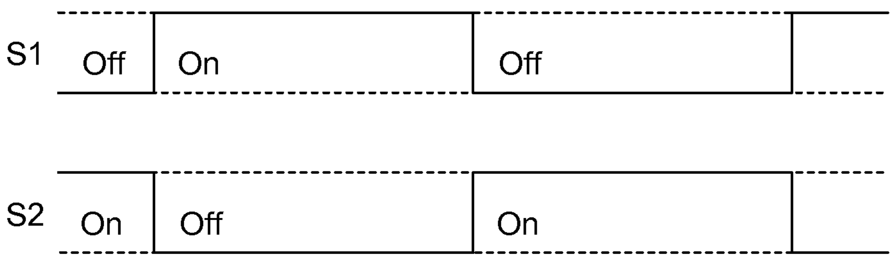
FIG. 5 shows switch control signals for the circuitry of FIG. 3.

FIG. 5 illustrates the switching scheme which is used to generate the voltage signals illustrated in FIG. 4 as can be seen, the actuating voltage signal Vew is generated by alternately switching S1 and S2 on and off, S1 being on whilst S2 is off and vice versa.

In the case of electrowetting displays, the voltage step required for switching an electrowetting element between a closed state and an open state is typically above 20 volts, and can be in the region of 30 volts.

Figure 6:
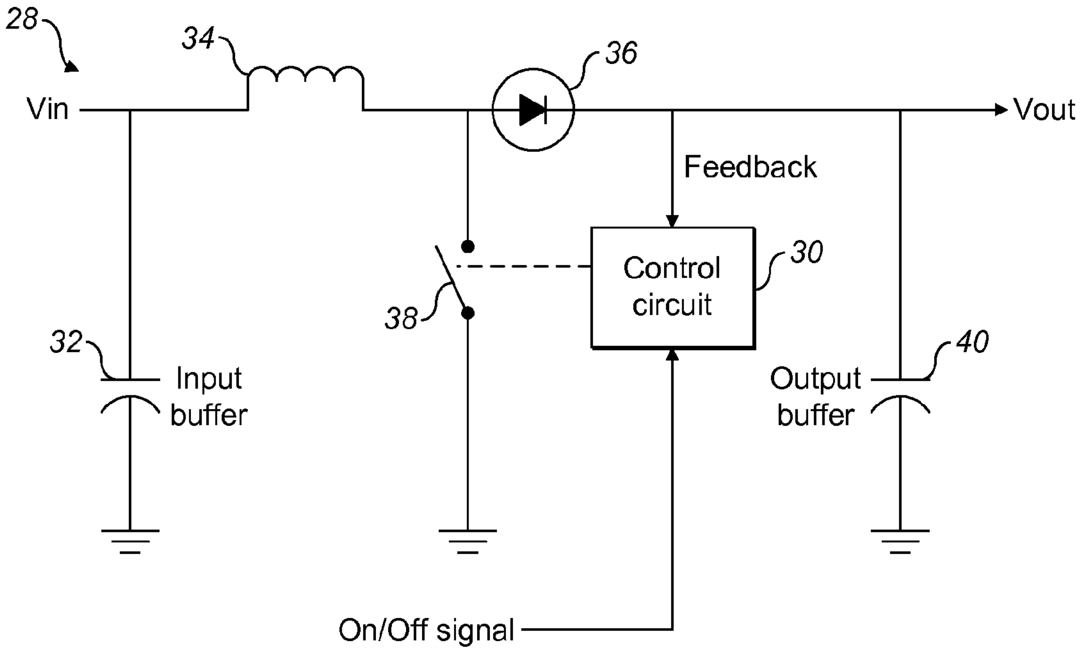
FIG. 6 shows a DC-DC booster circuit according to an embodiment of the invention.

FIG. 6 illustrates a DC-DC booster circuit which is used in embodiments of the invention. The DC-DC booster circuit 28 is used to boost up a battery voltage to a higher voltage level in a single stage. The booster circuit includes a control circuit 30 which is a separate integrated circuit (IC) with a stand-by input control.

The voltage booster circuit, which is connected to an input buffer 32, includes an inductor 34, a diode 36 and a switch 38, and is further connected to an output buffer 40. The operation of the voltage booster circuit is as follows: when the switch 38 is closed, current flows through the inductor 34 via the switch 38 to ground causing charge to be stored in the inductor 34. When the switch 38 is opened, because of the inductance of the coil, the voltage at the anode of the diode 36 swings up, and current flows through the diode 36, causing charge to be stored in the output buffer 40. The voltage at the output buffer 40 will rise to a higher level than the input voltage Vin, and the charge built up in the inductor 34 while the switch was closed will be stored in the output buffer 40. The diode 36 prevents current flowing from the output buffer 40 to the input buffer 32, thereby ensuring that charge is retained in the output buffer 40. The output buffer 40 is therefore driven to, and will stay at, a higher voltage than the voltage at the input buffer 32.

The control circuit 30 typically operates the switch 38 with a switching frequency of about 25 kHz to 2.5 MHz. By using a feedback loop connected to the control circuit 30, the control circuit adapts the switching frequency of the switch 38 when the output voltage has reached a predetermined voltage; operation of the feedback loop is described in detail below.

Since in the case of electrowetting displays the display load is relatively small, the booster circuit 28 can be switched off, leaving the output buffer to provide the needed display power. The booster circuit 28 can be switched off by putting the control circuit 30 in stand-by mode, during which time the power dissipation in the voltage booster circuitry itself is negligible.

Typically, the off-time is of the order of tens of milliseconds, for example about 20 ms, and the on-time is of the order of hundreds of microseconds, for example 100 microseconds. The on/off scheme may be set depending on the expected display load—this can be a fixed scheme, permanently set depending on the characteristics of the display, or can be a varying scheme which is varied in dependence on a current display condition of a display. In any case, the on-off scheme is applied during active display, that is to say, when a display voltage is being applied to one or more of the electrowetting elements.

Figure 7:
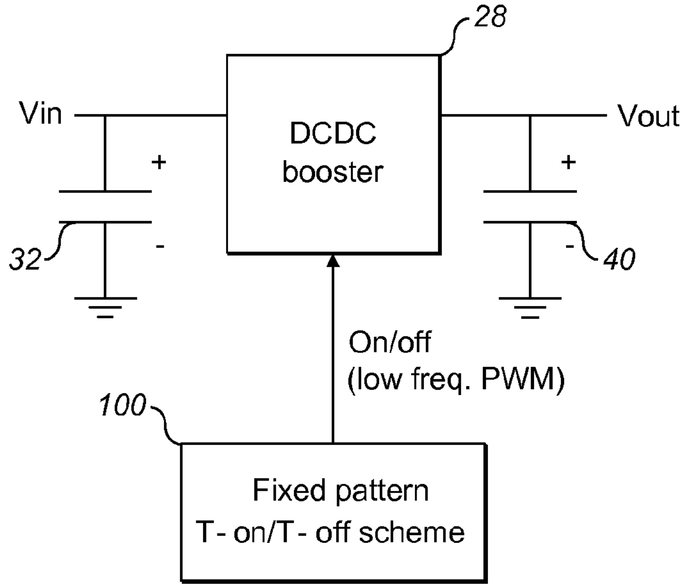
FIG. 7 shows a burst mode control arrangement for a DC-DC booster according to an embodiment of the invention.
Figure 8:
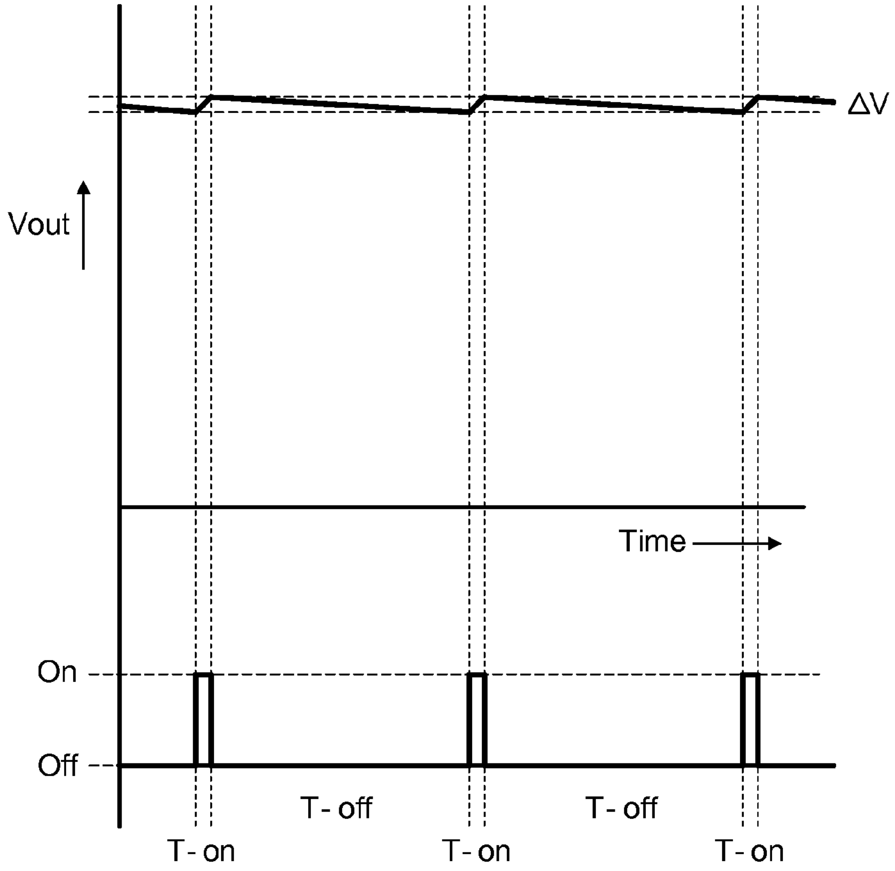
FIG. 8 shows voltage signals generated using the arrangement of FIG. 7.

FIG. 7 schematically illustrates one mode of control of the voltage booster circuit 28. In this mode, a microcontroller 100 provides a fixed pattern on/off scheme. The scheme is illustrated in FIG. 8, with booster on-pulses of fixed duration being intermittently applied at fixed intervals. As can be seen, the Vout signal varies with a voltage ripple variation due to discharge of the output buffer as the display is driven during the booster-off periods. The magnitude ΔV of the voltage ripple variation is, in this embodiment, approximately one volt, whereas the average magnitude of Vout is approximately 30 volts.

Figure 9:
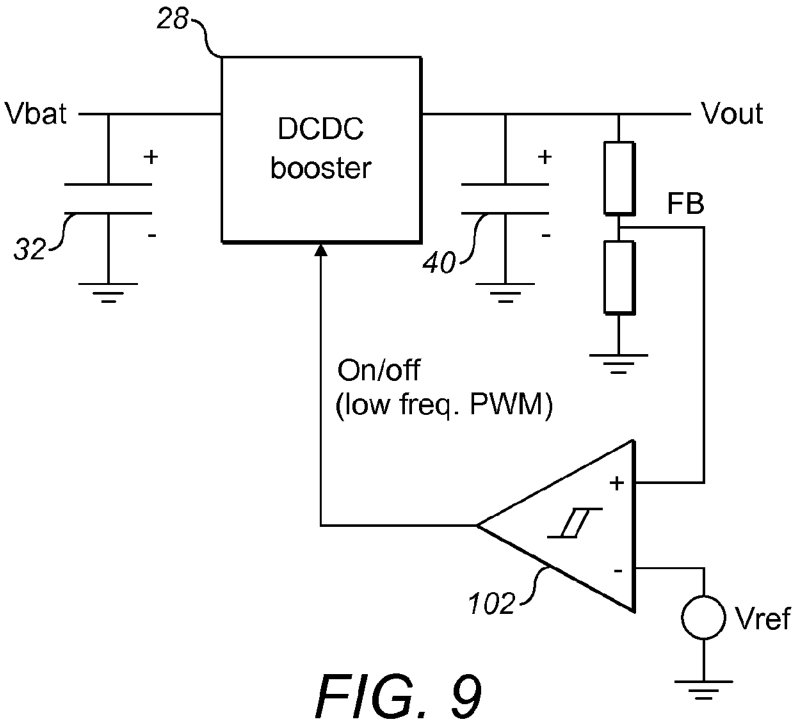
FIG. 9 shows an alternative burst mode control arrangement for a DC-DC booster according to an embodiment of the invention.
Figure 10:
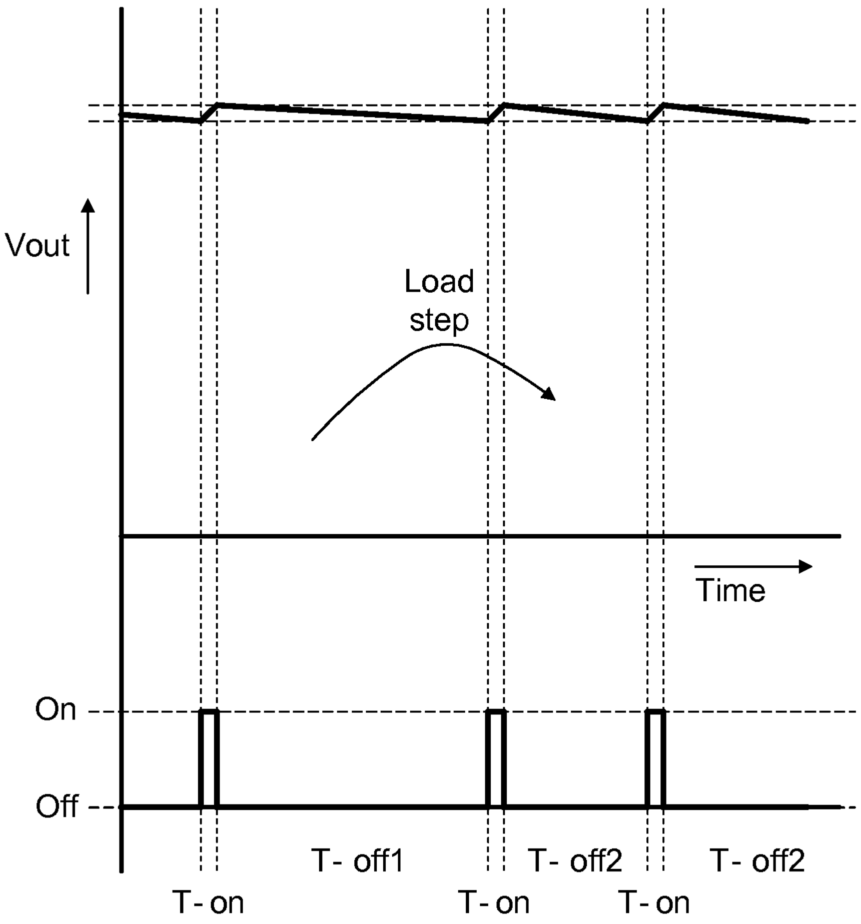
FIG. 10 shows voltage signals generated using the arrangement of FIG. 9.

FIG. 9 illustrates a further embodiment of the invention, in which the pattern of the booster on/off scheme is not fixed, but subject to feedback depending on the output voltage of the voltage booster 28. In this case, the feedback arrangement includes a comparator 102 which compares a feedback voltage FB, derived from the booster output voltage, to a reference Vref. When the feedback voltage FB falls below the reference voltage Vref, the comparator 102 applies an on-pulse to the booster circuit 28. The frequency of application of the on-pulse in this case depends on the load applied. As shown in FIG. 10, when there is a load step, i.e. an increase in the load due to, for example, switching of the display, the frequency of the on-pulses increases.

A problem with the scheme shown in FIGS. 9 and 10 is that the feedback circuitry itself consumes power. Thus, whilst the burst mode operation of the booster circuit is intended to reduce power, the use of a feedback circuit tends to have the opposite effect. Thus, instead of using a feedback circuit, it is possible to vary the frequency of the on-pulses, or indeed the length of the on-pulses, by taking into account factors which are known to introduce variations in load. For example, the microcontroller arrangement shown in FIG. 7 may be used to apply a scheme where the frequency of the on-pulses is varied in dependence on one or more control signals and thus not on feedback from an output of the voltage booster circuit. For example, in the case of a segmented display, the microcontroller may have knowledge of the number of segments currently being driven and the microcontroller 100 can be arranged to increase the frequency of the on-pulses when more segments of the display are being driven.

Figure 11:
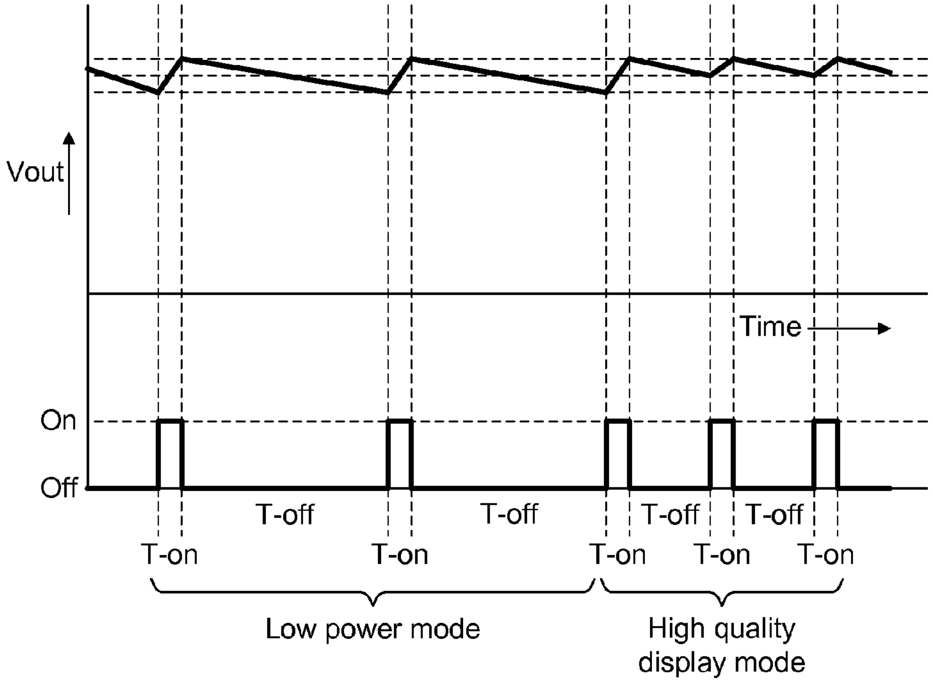
FIG. 11 shows voltage signals generated according to an embodiment.

In the above-described embodiments, the magnitude of the voltage ripple variation is limited to ensure that the image on the electrowetting display is not significantly degraded. In a further embodiment of the invention, an example of which is illustrated in FIG. 11, the display driver has two separate modes. In a first mode, a high quality display mode, the variation in voltage ripple is limited to a relatively small range. In a second mode, which is a low power mode, the quality of the image display may be reduced in return for power saving, and the magnitude of permissible variation in voltage ripple may be increased. A control signal, indicating a low power mode, may be used to switch between the modes.

International patent application WO 2003/071346 discloses measures that allow the second liquid to cover the area of the electrowetting element only partially, thereby realizing so-called grey values. Such a scheme may also be used in embodiments of the present invention. The grey values may be obtained by applying a pulse-width modulated voltage signal to each of the electrowetting elements which are selected to be in a common grey value display state.

The above embodiments are to be understood as illustrative examples of the invention. Further embodiments of the invention are envisaged.

For example, whilst whereas in the above embodiments the display is a segmented display, in which the segments form the individually addressable image regions, the display may alternatively be in the form of a matrix of pixels, in which the pixels form the individually addressable image regions.

Furthermore, whilst in the above embodiments the booster circuit is in the form of an inductive voltage booster, other types of voltage booster may be used, such as a capacitive booster.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of driving an electrowetting display having a high quality display mode and a low power mode, the display including a plurality of electrowetting elements and comprising at least one first fluid and a second fluid immiscible with each other, each of said electrowetting elements comprising at least one surface area, wherein in a first, relatively low voltage, driving state of an electrowetting element said second fluid tends to cover said at least one surface area, and in a second, relatively high voltage, driving state of an electrowetting element said first fluid tends to cover said at least one surface area, the method comprising:

providing a voltage booster circuit to generate a voltage signal to be applied across one or more selected ones of said plurality of electrowetting elements; and during driving of said one or more selected elements in said second driving state, selectively switching said voltage booster circuit on and off such that said voltage booster circuit is operative only some of the time and said voltage signal includes a voltage ripple variation;

a magnitude of the voltage ripple variation being larger in the low power mode than in the high quality display mode.

2. A method according to claim 1, wherein said voltage booster circuit is operative less than half of the time, on average.

3. A method according to claim 2, wherein said voltage booster circuit is operative less than a quarter of the time, on average.

4. A method according to claim 3, wherein said voltage booster circuit is operative less than one tenth of the time, on average.

5. A method according to claim 1, wherein said voltage booster circuit is switched on and off according to a fixed scheme.

6. A method according to claim 1, wherein said voltage booster circuit is switched on and off according to a variable scheme.

7. A method according to claim 6, wherein said variable scheme is controlled in dependence on one or more control signals which are dependent on feedback from an output of said voltage booster circuit.

8. A method according to claim 6, wherein said variable scheme is controlled in dependence on one or more control signals which are not dependent on feedback from an output of said voltage booster circuit.

9. A method according to claim 1, wherein said electrowetting display is a segmented display in which said electrowetting elements are arranged in image regions and each of said image regions corresponds with a different segment of the display, said selected elements corresponding to selected segments.

10. A method according to claim 1, wherein a plurality of said electrowetting elements are fluidly interconnected and arranged such that said first fluid is capable of conveying said voltage signal to each of said plurality of interconnected electrowetting elements.

11. Electro-optic display apparatus adapted to perform the method of claim 1.

* * * * *